United States Patent [19]

Koester, Jr.

[11] 4,087,706

[45] May 2, 1978

[54] ELECTRONIC LEVEL SWITCH CONTROL SETUP

[75] Inventor: George L. Koester, Jr., Woodcliff Lake, N.J.

[73] Assignee: Hynes Electric Heating Company, Kenilworth, N.J.

[21] Appl. No.: 634,940

[22] Filed: Nov. 24, 1975

[51] Int. Cl.² .................. G08B 27/00; H03K 3/26; H01H 29/28; G08B 21/00
[52] U.S. Cl. ................. 307/308; 307/252 B; 307/311; 328/1; 340/244 R; 200/84 R; 200/190
[58] Field of Search ............. 307/308, 311; 328/1–5; 340/244 R, 244 B, 244 SC; 73/304 R, 308, 313; 200/230, 84, 243, 277

[56] References Cited

U.S. PATENT DOCUMENTS

| | | |
|---|---|---|
| 2,413,020 | 12/1946 | Wolfner et al. ............ 340/244 C |
| 2,661,411 | 12/1953 | Berger ........................... 200/84 R |
| 3,008,420 | 11/1961 | Davis ............................. 200/84 R |
| 3,291,149 | 12/1966 | Atkins et al. ................. 73/304 R |
| 3,723,769 | 3/1973 | Collins ............................... 307/311 |
| 3,839,651 | 10/1974 | Michaels ...................... 73/304 R |

Primary Examiner—Stanley D. Miller, Jr.
Assistant Examiner—B. P. Davis
Attorney, Agent, or Firm—Jackson and Chovanes

[57] ABSTRACT

The present application presents a setup utilizing a float in an enclosed space as a bridging contact, on the basis of the liquid level in the area to control, to activate a semiconductor relay having a time delay for such activation, and is especially valuable where the liquid level involved is that of a non-conductive liquid under severe conditions.

2 Claims, 2 Drawing Figures

ELECTRONIC LEVEL SWITCH CONTROL SETUP

DISCLOSURE OF INVENTION

The present invention relates to an electronic level switch control setup.

In what is believed to be the commonest form of liquid level control setups of the prior art, electrode probe elements at different heights are located where the liquid will have access to them, and when the liquid is high enough to bridge between them, this establishes a current through the particular relay setup used for the control desired.

Where for example the liquid is electrically nonconductive, as for example in the case of the eutectic mixture of diphenyl and diphenyl oxide used as a heat transfer medium which often goes under the trade name of Dowtherm, this particular setup does not work, and a different expedient must be used. Such an expedient which has been utilized is the use of a tubular float to magnetically induce action in a nearby switch. This, however, has had various disadvantages, one of which is that when, as is likely to be true, the chamber in which the liquid level is desired to be controlled is under severe conditions of temperature, for example, these conditions likewise affect the nearby switch, and cause it to deteriorate all too rapidly and require replacement entirely too soon.

The present invention closes the circuit directly by contact with electrodes by a conductive float made of hollow metal which is floating on the liquid, rather than by the liquid itself, giving a positive on-and-off type of circuit closure, and at the same time a fundamentally valuable simplicity in this aspect of the overall circuit. When the circuit is closed, this operates after a delay through a solid state relay with extremely small currents, and thus the fact that it has a contact-non contact system does not create arcs in the area where contact is made and broken. The absence of arcs contributes greatly to the safety of the device, which can operate in what might otherwise be extremely dangerous environments, such as even an acetylene atmosphere, without causing any safety problems such as arcing, fires and the like.

This involves a changed electrical circuit which has the advantages of a delay and a very small current. Thus the present invention is at once quite safe and economical and operates only when the liquid level has reached a steady position calling for such operation.

Figure 1:
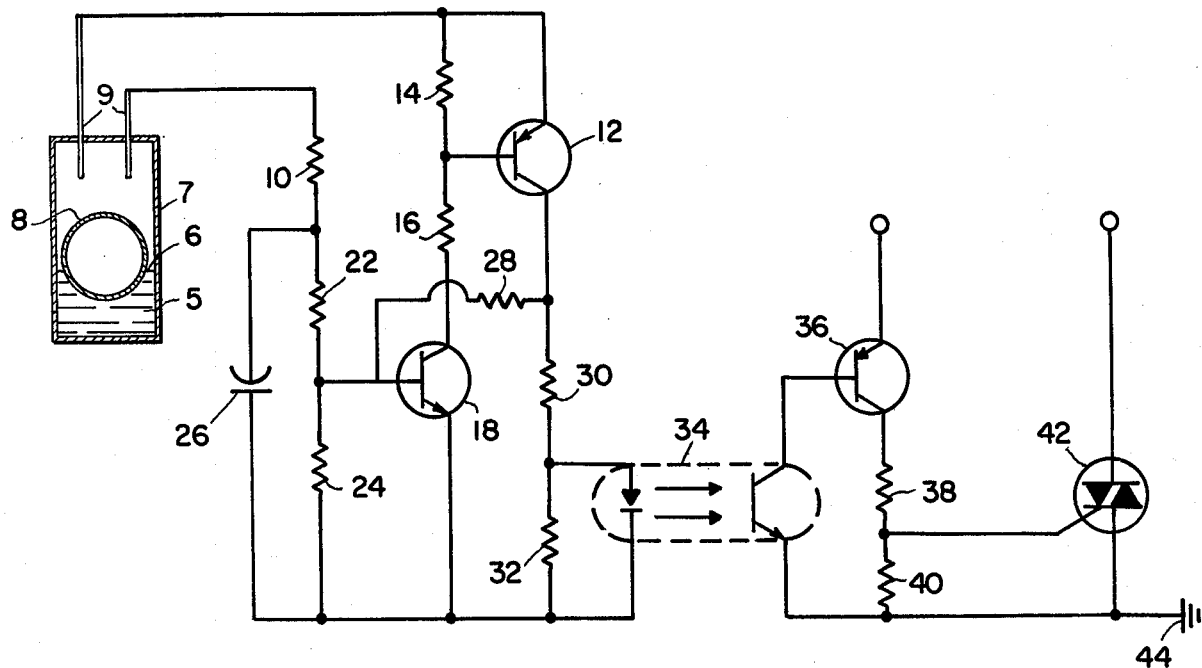
FIG. 1 is a schematic view including a circuit which has a float with a relatively complicated control mechanism, shown in the position in which the circuit is off.

A portion of the circuit which more nearly adjoins the float is the same in both forms and the portion more remote than this from the float is different.

The device of the invention in the illustrative embodiments shown in the drawings includes elongated vertical chamber 7, having access to the space whose liquid level is to be measured (not shown), which leads to there being liquid 5 in the elongated chamber up to a level 6 there, dependent upon and reflecting the level in the chamber. On that liquid is floating hollow metal sphere 8 at a level fixed by the liquid. Contacts 9 are above this sphere and out of contact with it at one level of the liquid, the level which happens to be shown in the drawing. If the liquid reaches a sufficiently higher level, the sphere which is made of some relatively resistant conductive metal such as stainless steel, will reach and bridge these contacts.

The preferred circuit is the one which seems more complicated, that of FIG. 1, with the other one being less preferred. In the preferred circuit of FIG. 1, describing it from the leftmost of the contacts 9 in the FIG. 1 which has a connection (not shown) to a positive 9 volt electric source in the specific circuit there illustrated, the circuit then goes to connect directly to the emitter of a particular transistor 12, 2N2907A being a particular transistor which can be used (which can additionally be used for a third transistor 36 later to be described), and also through a resistance 14 of 560 ohms in this example to the base contact of that transistor 12, also connected with the collector of a second transistor 18 by way of a resistor 16 of 1800 ohms in between.

As to this second transistor 18, 2N1711 is a particular transistor that can be used, and the respective connections are such as to involve a full wave transmission situation. This second transistor 18 has its base contact connected through respective resistances 22 and 24, each of 22,000 ohms, to each side of a condenser 26, of 45 microfarads, 5 volts.

One side of condenser 26 is also connected to the right hand one of the contacts 9 through resistor 10 of 10,000 ohms. The base of transistor 18 is also connected to the collector of transistor 12 through resistance 28 of 680,000 ohms.

The collector of transistor 12 is also connected through resistance 30 of 560 ohms to one of the electrodes of diode of an optical coupler 34, which may be for example Motorola No. 1990-04077425. The emitter of transistor 18 connects to the opposite side of this diode and also to the side of the condenser 26 away from that condenser's connector to the right hand side of contacts 9. Between these two connections to the diode is interconnection through resistance 32 or 560 ohms.

The optical coupler has also at its other end, capable of being affected by the light emitted by the diode, a transistor whose base is inside. Its emitter is connected to ground 44, while its collector is connected to a third separate transistor 36 and more specifically to the base contact of that third separate transistor 36. The emitter of that third transistor is connected to a 9 volt tap, while the collector connects through a 68 ohm resistance 38 to the trigger contact of a three ampere triac 42. Also connected through a resistance 40 to this trigger connection, the resistance there being 100 ohms, is the line between the emitter of the optical coupler 34's transistor and the ground 44. In addition to the trigger connection the triac 42 is connected to a 120 volt AC tap and also to ground in its other two contacts.

Thus, when the trigger connection operates to do this, a connection will be effected between the 120 volt AC and the ground which also puts the 120 volt AC into the part of the circuit which has been described as connected to ground.

The operation of the triggering connection to close the 120 volt AC circuit has the effect of enabling that 120 volt AC circuit to do whatever it may be desired to do when the liquid level reaches a particular point.

Figure 2:
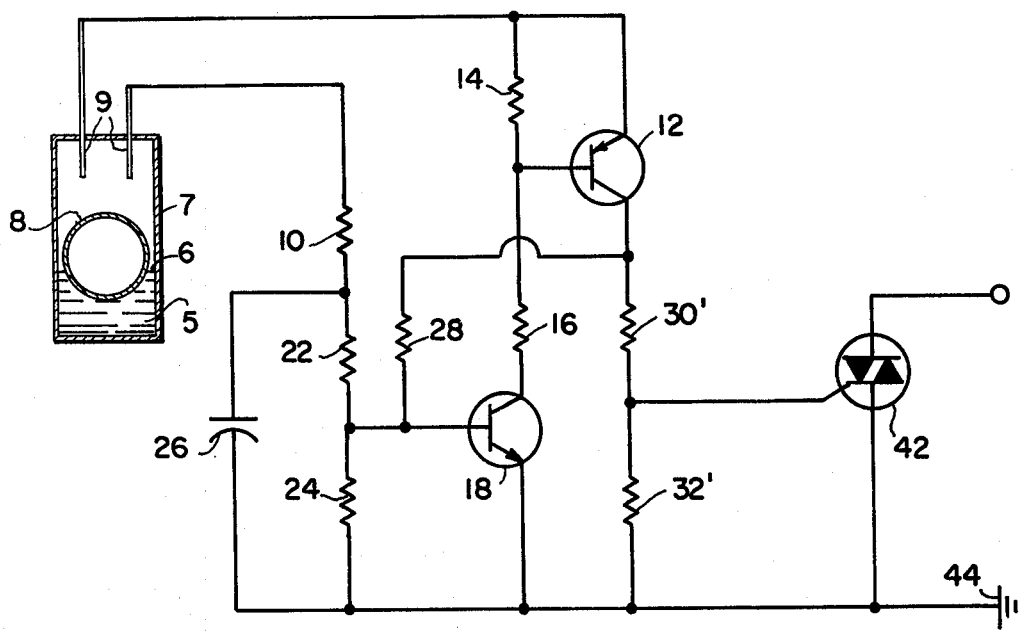
FIG. 2 is a similar view showing an alternative less preferred form in which the circuit is simpler.

The circuit of FIG. 2 is a less desirable alternative which, however, is simpler and less expensive and involves what overall in terms of its various components might offhand appear to be generally the same circuit as that of FIG. 1, except that it includes no optical coupler or special third transistor connected to a 9 volt tap. Instead, at the points which are connected in the preferred circuitry of FIG. 1 to the electrodes of the optical coupler, there is a connection from the last points previously described directly to the trigger connection of a three ampere triac. The two other connections of the triac are to the line and the ground respectively. In this form of FIG. 2, the different connections and resistances are mostly similar to those in the left portion of FIG. 1.

However, in FIG. 2, the value of resistor 30' is 68 ohms, 2 watts, as compared to 560 ohms in correspondingly placed resistor 30 in the lefthand portion of FIG. 1, and resistor 32' is 100 ohms, as compared to the 560 ohms in the correspondingly placed resistor 32 in the lefthand portion of FIG. 1.

In both cases, the operation of the circuit is such that when the liquid level in the place subject to control comes high enough to bring the ball 8 up against the contacts 9, the circuit in the left closes and ater 1 or 2 seconds delay, if the contact persists in the meantime, the triggering connection causes the 120 volt AC circuit to close and to carry out the function for which the remote control circuit is intended.

As already indicated, this action requires only a very small current in the control circuit, actually only about three quarters of a milliamp, and despite the fact that the float is, as far as it itself is concerned, a short-circuiting contact, no arc is produced and no dangerous effects, as fire or the like, even in a medium involving acetylene.

In view of my invention and disclosure, variations and modifications to meet individual whim or particular need will doubtless become evident to others skilled in the art to obtain all or part of the benefits of my invention without copying the structure shown, and I, therefore claim all such insofar as they fall within the reasonable spirit and scope of my claims.

Having thus described my invention what I claim as new and desire to secure by Letters Patent is:

1. A remote control device responding to conditions in a particular locale, comprising an electrically conductive sensor whose level is determined by conditions in the locale, electrical contacts, the sensor having a position in which it will be out of contact with these electrical contacts and another position in which it will be in contact with the electrical contacts, and an electric circuit, said electrical contacts being located to provide a gap in the electrical circuit which said sensor will close in the position in which it is in contact with the contacts, and that circuit including a solid state relay adapted to energize an item being controlled, the solid state relay circuit having a portion including two transistors, another portion including a triac, and an optical coupler between these two portions, and the two transistors each having different parts connected to one of the contacts from those parts which are connected to the other of the contacts, and more specifically one of the there-mentioned transistors having an emitter and a base connected to the first of the contacts and the other having a collector connected to the first of the contacts, while the first-mentioned of the transistors has a collector connected to the second of the contacts and the second-mentioned of the transistors has a base and emitter connected to the second of the contacts, and there being a cross connection between the base of the first-mentioned transistor and the collector of the second-mentioned transistor, and a cross connection between the base of the second-mentioned transistor and the collector of the first-mentioned transistor, and likewise a cross connection between the base and emitter of the first-mentioned transistor and also a cross connection between the base and emitter of the second-mentioned transistor.

2. A device of claim 1, in which each of the cross connections mentioned in claim 1 includes at least one resistance.

* * * * *